United States Patent
Joswig et al.

(10) Patent No.: US 10,505,174 B2
(45) Date of Patent: Dec. 10, 2019

(54) ELECTROCHEMICAL ACCUMULATOR

(71) Applicant: Clarios Advanced Solutions GmbH, Hannover (DE)

(72) Inventors: Ralf Joswig, Buchholz (DE); Helge Brenner, Hannover (DE); Bernhard Ehrlich, Hannover (DE)

(73) Assignee: Clarios Advanced Solutions GmbH, Hannover (DE)

( * ) Notice: Subject to any disclaimer, the term of this patent is extended or adjusted under 35 U.S.C. 154(b) by 388 days.

(21) Appl. No.: 15/032,588

(22) PCT Filed: Oct. 27, 2014

(86) PCT No.: PCT/EP2014/073022
§ 371 (c)(1),
(2) Date: Apr. 27, 2016

(87) PCT Pub. No.: WO2015/063037
PCT Pub. Date: May 7, 2015

(65) Prior Publication Data
US 2016/0268583 A1   Sep. 15, 2016

(30) Foreign Application Priority Data

Nov. 1, 2013 (DE) .................. 10 2013 112 060

(51) Int. Cl.
*H01M 2/30* (2006.01)
*H01M 2/26* (2006.01)
(Continued)

(52) U.S. Cl.
CPC ............. *H01M 2/305* (2013.01); *H01M 2/22* (2013.01); *H01M 2/263* (2013.01); *H01M 2/266* (2013.01);
(Continued)

(58) Field of Classification Search
CPC . H01M 2/02–0235; H01M 2/04–0495; H01M 2/06–08; H01M 2/20–28; H01M 2/30–307
(Continued)

(56) References Cited

U.S. PATENT DOCUMENTS 6,156,452 A * 12/2000 Kozuki ................. B23K 31/02
429/161
7,501,202 B2   3/2009 Enomoto et al.
(Continued)

FOREIGN PATENT DOCUMENTS

CN       201146250       11/2008
DE       8913234 U1      12/1989
(Continued)

OTHER PUBLICATIONS

PCT/EP2014/073022 International Search Report and Written Opinion dated Feb. 4, 2015.
(Continued)

*Primary Examiner* — Bach T Dinh
(74) *Attorney, Agent, or Firm* — Christopher & Weisberg, P.A.

(57) ABSTRACT

The invention relates to an electrochemical accumulator comprising at least one housing and at least one electrochemical cell disposed in said housing as well as at least two electrical connection terminals for electrically contacting the accumulator, wherein at least one of the connection terminals is formed from at least two interconnected sections of differing metals or metal alloys. The invention furthermore relates to a method for manufacturing an electrochemical accumulator.

13 Claims, 3 Drawing Sheets

Figure 1:
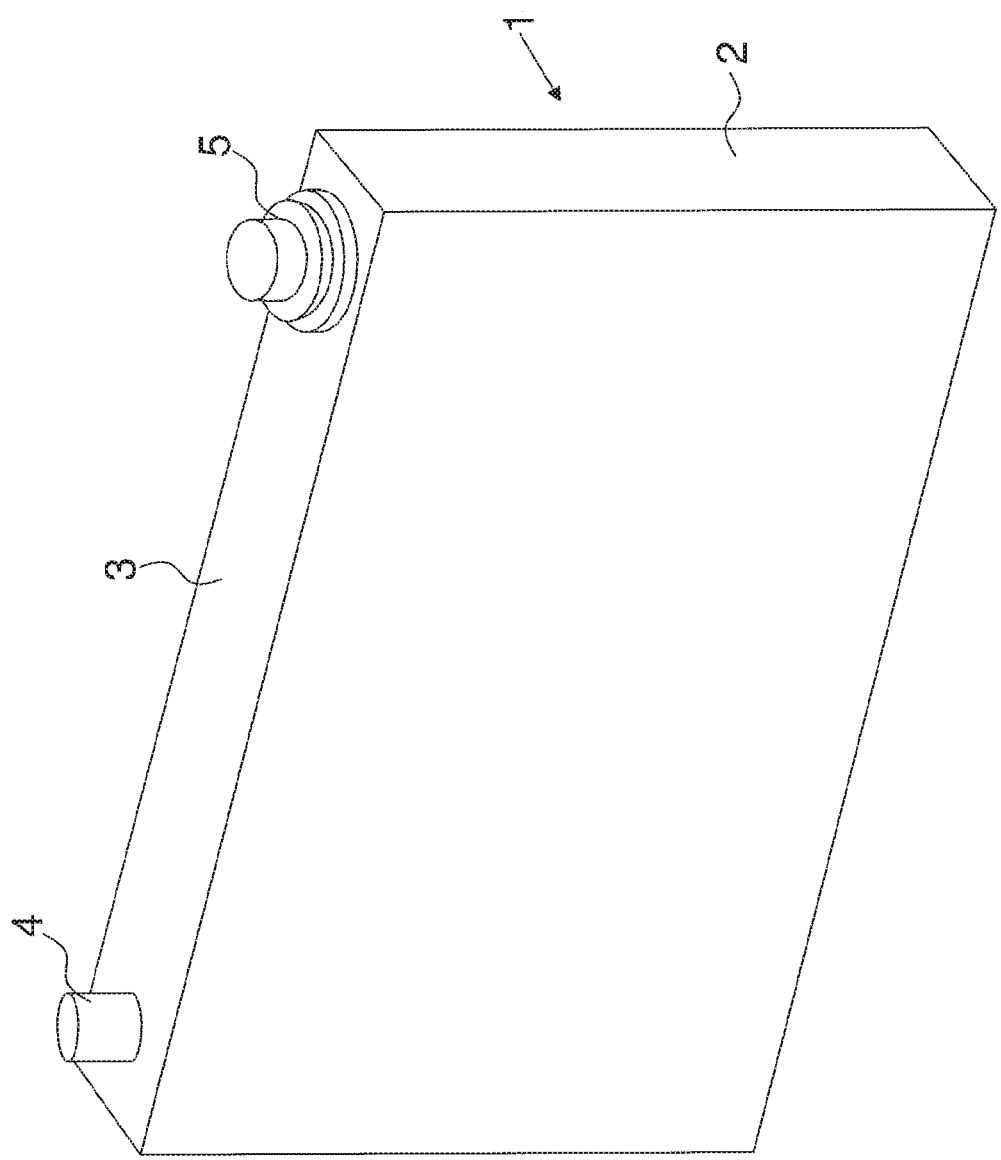

(51) Int. Cl.
  *H01M 2/22* (2006.01)
  *H01M 10/0525* (2010.01)
  *H01M 2/20* (2006.01)

(52) U.S. Cl.
  CPC ....... *H01M 2/307* (2013.01); *H01M 10/0525* (2013.01); *H01M 2/206* (2013.01); *H01M 2220/20* (2013.01)

(58) Field of Classification Search
  USPC .......................................... 429/65, 463–187
  See application file for complete search history.

(56) References Cited

U.S. PATENT DOCUMENTS

| | | | | |
|---|---|---|---|---|
| 2006/0051664 | A1* | 3/2006 | Tasai | H01M 2/266 429/161 |
| 2009/0223940 | A1 | 9/2009 | Hosoya | |
| 2011/0244308 | A1* | 10/2011 | Byun | H01M 2/204 429/158 |
| 2012/0021277 | A1* | 1/2012 | Byun | H01M 2/0469 429/178 |
| 2012/0183818 | A1* | 7/2012 | Byun | H01M 2/0473 429/61 |
| 2012/0301761 | A1* | 11/2012 | Sasaki | H01M 2/263 429/94 |
| 2013/0115494 | A1* | 5/2013 | Kim | H01M 2/30 429/94 |
| 2014/0212741 | A1* | 7/2014 | Kim | H01M 2/06 429/179 |
| 2015/0287970 | A1* | 10/2015 | Shinohara | H01M 2/1072 429/158 |

FOREIGN PATENT DOCUMENTS

| | | |
|---|---|---|
| DE | 102008031175 A1 | 1/2010 |
| DE | 202011106222 | 2/2012 |
| WO | 2011113633 | 9/2011 |
| WO | 2013176914 | 11/2013 |

OTHER PUBLICATIONS

EP 14789837.3 Office Action dated Jun. 2, 2017.
CN 201480058594.X Office Action dated Nov. 28, 2017.

\* cited by examiner

ELECTROCHEMICAL ACCUMULATOR

The invention relates to an electrochemical accumulator according to the preamble of claim 1. The invention furthermore relates to a method for manufacturing an electrochemical accumulator in accordance with the preamble of claim 12.

Such electrochemical accumulators are utilized in many fields of technology. The present invention relates in particular to the field of accumulators for electric and hybrid vehicles. These types of accumulators are subject to specific requirements in terms of efficiency, weight and manufacturing costs.

The invention addresses the task of more efficiently designing electrochemical accumulators for mass production, particularly for automated production processes in automotive engineering applications. An improved method for manufacturing such accumulators is further to be specified.

The task is solved according to claim 1 by an electrochemical accumulator which comprises at least one housing and at least one electrochemical cell disposed in said housing as well as at least two electrical connection terminals for electrically contacting the accumulator, wherein at least one of the connection terminals is formed from at least two interconnected sections of differing metals or metal alloys. The at least one connection terminal can for example consist of two separate, individually manufactured metal pieces forming the connection terminal's two sections of different metals or metal alloys. This type of connection terminal, which may also be called a bi-metal or multi-metal connection terminal, is able to better fulfill a number of specific requirements related to the manufacturing of individual accumulators and accumulator arrangements having a plurality of individual accumulators. In practice, there are multiple problems associated with the chemical properties of the chemicals used in creating an electrochemical cell. With respect to preventing corrosive effects, there is already a limited selection of specific material for producing connection terminals based on the type of cell technology employed. Connecting a plurality of accumulators, e.g. in a series connection, has to date been done by interconnection by way of e.g. bolted power buses or bus bars respectively. A welded or soldered joint would in many cases be more advantageous with respect to improving the manufacturing process. Yet in many cases this is in turn not possible due to the limited choice of materials for the connection terminals or is coupled with increased manufacturing costs. That as proposed by the invention, forming at least one of the connection terminals from at least two interconnected sections of differing metals or metal alloys, can transform as it were the material best suited for contact with the electrochemical cell into the material best suited for the external electrical connection of the connection terminal to connection terminals of other accumulators.

The at least one connection terminal, which comprises the at least two interconnected sections of different metals or metal alloys, can be formed as a bolt-type connection terminal or as a connection terminal without bolted connectivity. In the first case cited, the connection terminal can be connected to a connection terminal of a further electrochemical accumulator in for example a bolted connection via a power bus or bus bar. In the latter case, the connection can for example be made by soldering or welding to a power bus or bus bar.

According to one advantageous further development of the invention, only a first of the at least two sections of the connection terminal is connected in direct mechanical and electrical contact with the positive or negative terminal of the at least one cell disposed in the housing. Another second section of the connection terminal is only indirectly connected to the cell terminal via the first section. Doing so can thus prevent unwanted chemical and/or electrochemical processes which can otherwise occur due to the differing materials of the first connection terminal section versus the cell terminal. The first section can for example be formed from the same material as the material of the cell terminal with which the first section is in direct mechanical and electrical contact.

According to one advantageous further development of the invention, one section of the connection terminal comprises or consists of copper. Another section of the connection terminal comprises or consists of aluminum. Particularly the above-cited first section of the connection terminal in direct mechanical and electrical contact with the positive or negative terminal of the cell can comprise or consist of copper.

According to one advantageous further development of the invention, the at least one connection terminal exhibits an interface between the two interconnected sections of differing metals or metal alloys which is substantially parallel to the surface of the housing at which the connection terminal is disposed on said accumulator housing. This can thereby on the one hand ensure that the second connection terminal section, which is only indirectly connected to the cell terminal via the first section, is sufficiently distanced from the cell terminal. The interface can be an even or uneven surface. In particular, the interface can be formed as a junction plane. A substantially parallel junction plane thereby benefits the manufacturability of the multi-metal connection terminal and thus the entire electrochemical accumulator as a whole. In particular, the connection terminal's two sections of differing metals or metal alloys do not need to be interconnected until that point in the manufacturing process at which the first section has already been connected to the terminal of the cell, e.g. by spin welding.

According to one advantageous further development of the invention, the at least one connection terminal protrudes through a housing wall of the accumulator. The junction of the at least two interconnected sections of different metals or metal alloys is thereby situated within the housing or at least within an area sealed from the housing's external environment. This has the advantage of the housing protecting the junction between the two interconnected sections from external environmental influences, particularly humidity.

According to one advantageous further development of the invention, the at least one connection terminal, particularly the connection terminal of at least two interconnected sections of different metals or metal alloys, is a negative connection terminal of the accumulator. This can thereby prevent particularly undesirable effects in the area of the negative connection terminal in the case of certain accumulator cell technologies, e.g. lithium cells.

According to one advantageous further development of the invention, at least one second connection terminal of the accumulator is formed from the material of the accumulator housing. The second connection terminal as well as the housing can for example be made of or comprise aluminum. This enables a further simplified and more economical manufacturing of such accumulators. It can in particular be provided for the second connection terminal to be molded into a housing wall of the accumulator. The second connection terminal is thereby molded so as to protrude from the outer contour of the housing, e.g. in rotationally symmetric, cylindrical, frustoconical or prismatic form. This enables a particularly economical second connection terminal to be provided. In particular, no separate component is thereby required nor needs to be connected to the accumulator.

The housing of the accumulator can in particular exhibit a prismatic form, e.g. a substantially rectangular form, with rounded edges and/or corners where applicable.

According to one advantageous further development of the invention, the at least one cell within the accumulator housing is a lithium-ion cell. This is advantageous in terms of providing accumulators for electric and hybrid vehicles which have high storage capacity in a small space.

According to one advantageous further development of the invention, at least one, multiple or all of the connection terminals are of rotationally symmetric configuration.

The initially specified task is furthermore solved according to claim 12 by a method for manufacturing an electrochemical accumulator comprising at least one housing and at least one electrochemical cell disposed in said housing as well as at least two electrical connection terminals for electrically contacting the accumulator, wherein at least one of the connection terminals is formed from at least two sections of differing metals or metal alloys; these sections being connected together. According to one advantageous further development of the invention, the at least two sections of differing metals or metal alloys can be connected together by means of a friction welding process, e.g. spin welding. This is conductive to simple and economical manufacturing of the at least bi-metal connection terminal. In particular, the connection terminal can be prefabricated from two or more sections and subsequently mounted to the accumulator.

The spin welding can in particular be realized such that before being connected, the at least two sections of the connection terminal are moved relative to one another in a rotational motion and in the process are pressed against each other. Doing so creates heat which ultimately results in welding the two sections together. The spin welding is thereby a special form of friction welding. During the rotational motion, either one section of the connection terminal can be secured and the other section moved, or both sections can be moved toward each other. The rotational motion can be a continuous rotational motion in the same direction of rotation or a rotational motion of alternating rotational direction.

The following will reference the drawings in describing the invention in greater detail by way of embodiments.

Figure 2:
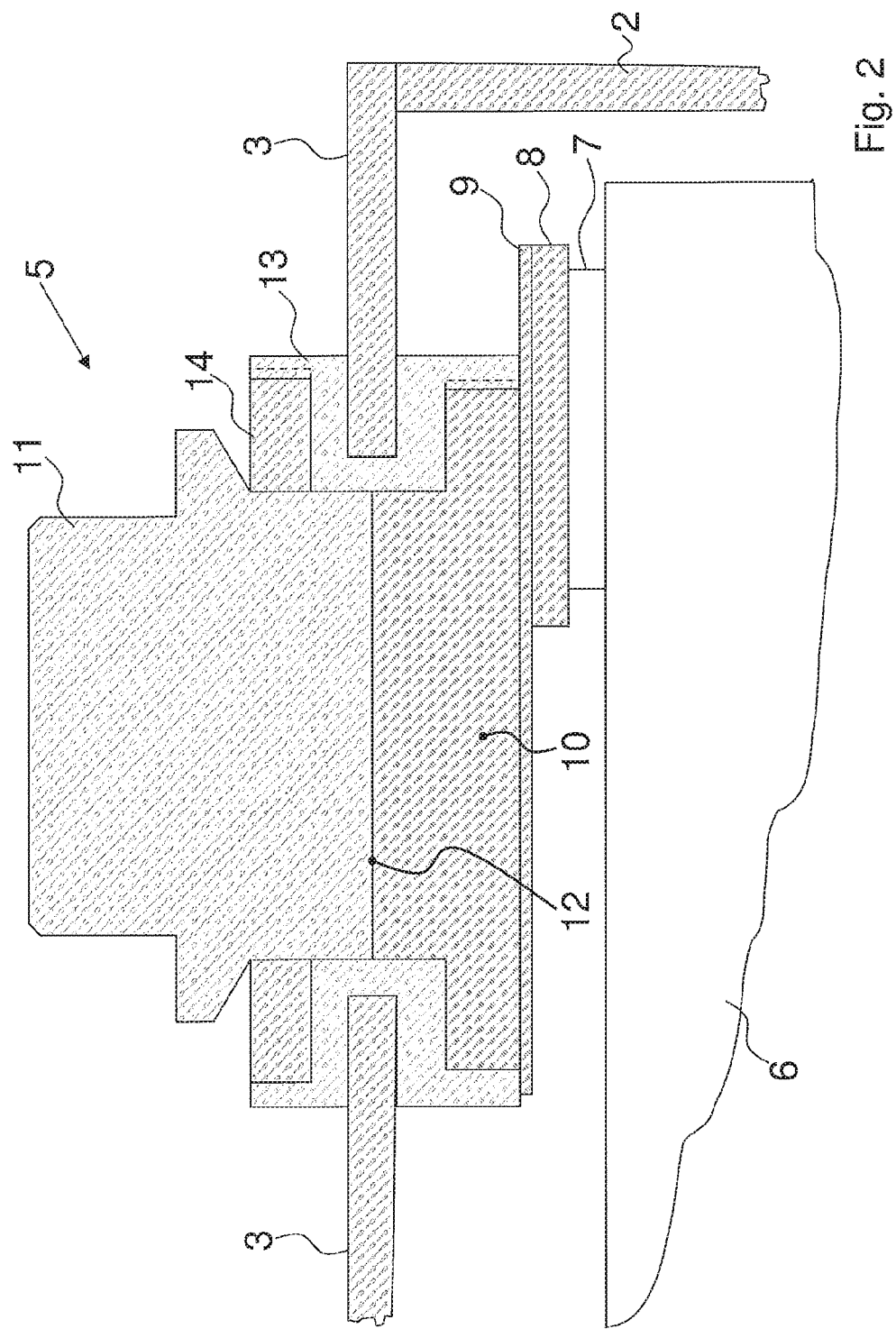
Figure 3:
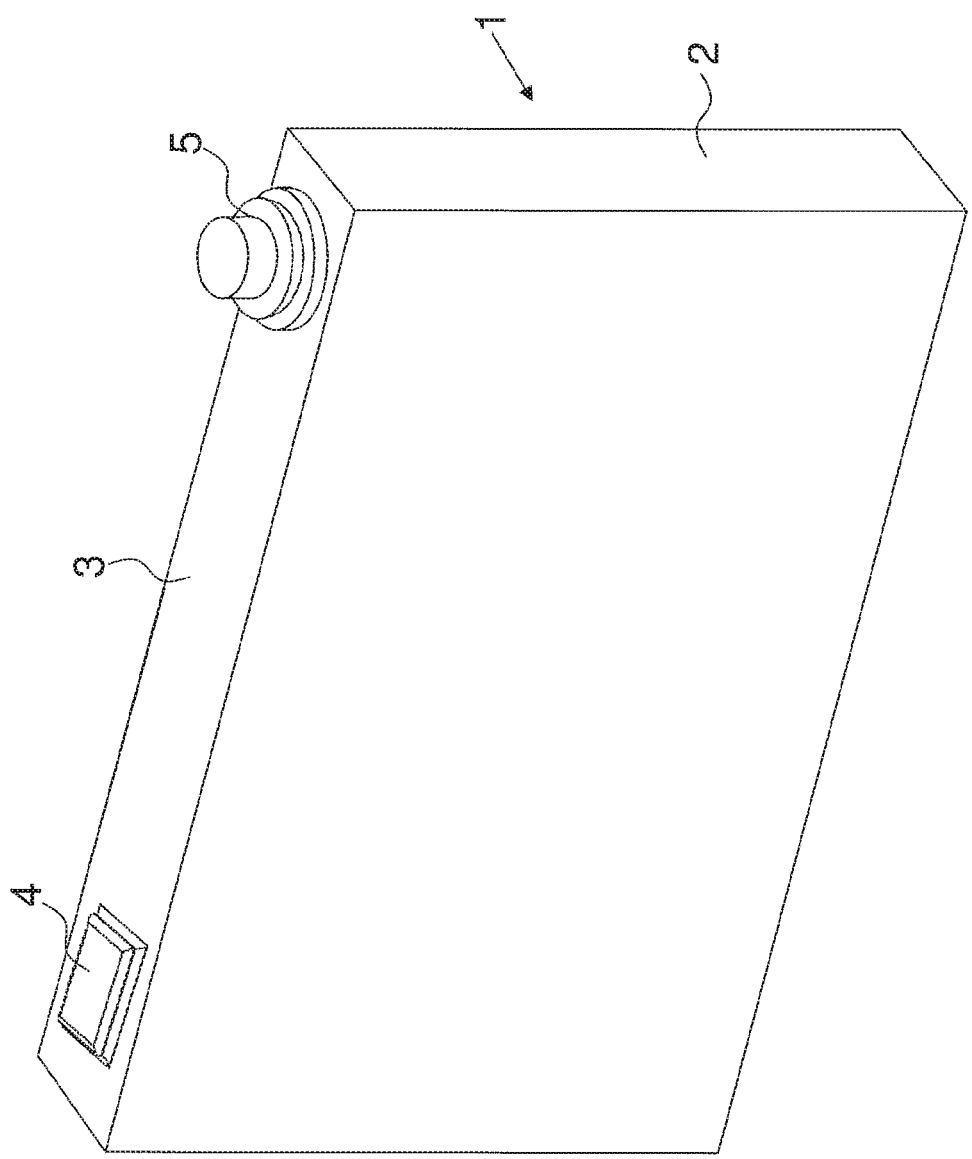

Shown are:

FIG. 1 an isometric view of an electrochemical accumulator;

FIG. 2 a sectional representation of part of the electrochemical accumulator of FIG. 1; and FIG. 3 an isometric view of a further embodiment of an electrochemical accumulator.

The figures make use of the same reference numerals for equivalent elements.

FIG. 1 shows an electrochemical accumulator 1 having a prismatic; i.e. substantially rectangular housing 2. Two electrical connection terminals 4, 5 protrude from the housing 2 of the accumulator 1 at one housing wall 3 of said housing 2. The connection terminals 4, 5 are electrically connected to one or more electrochemical cells disposed within the housing. Connection terminal 4 can have for example the cylindrical form recognizable in FIG. 1. The other connection terminal 5 exhibits a more complex form which will be described below in greater detail referencing the sectional representation provided in FIG. 2.

The connection terminal 5 is configured as a connection terminal having at least two interconnected sections of differing metals or metal alloys. This is depicted in FIG. 2 by means of an upper section 11 of the connection terminal along with a lower section 10 of the connection terminal arranged underneath. A junction 12 can be seen between the sections 10, 11 extending substantially parallel to the housing wall 3 or to the respective external surface of the housing wall 3 respectively. The upper section 11 is composed e.g. of aluminum, the lower section 10 of copper. The lower section 10 is connected to an electrical terminal 7 of a lithium-ion cell 6 disposed in the housing 2 by means of metal strips 8, 9, e.g. copper strips.

Components 8, 9, 10 are in particular formed from the same metal material. They can be connected together by welding, for example. The upper section 11 of the connection terminal 5can be welded to the lower section 10 by spin welding.

The housing 2 can in particular consist of a metallic, i.e. electrically conductive material. For this reason, the seal 13 is made from an electrically insulating material, particularly a plastic material. Connection terminal 5 is inserted through the seal 13 into the housing opening of the housing wall 3 and additionally sealed against the housing. The seal 13 in particular prevents external environmental influences from having any effect on components within the interior of the housing 2 or on the junction between the sections 10, 11 of the connection terminal 5. The upper section 11 of connection terminal 5 can additionally be secured in the seal 13 by a washer 14 to protect and mechanically support the seal 13.

FIG. 3 shows a further embodiment of an electrochemical accumulator which differs from the embodiment of FIG. 1 by a different embodiment to the connection terminal 4. It can be seen that the connection terminal 4 has a rectangular contour when viewed from above. The connection terminal 4 can be made from the material of housing 2, e.g. aluminum, and directly formed on the housing wall 3 in a molding process. Doing so does away with the manufacturing and mounting of a second connection terminal 4 as a separate component.

The invention claimed is:

1. An electrochemical accumulator comprising:
at least one housing;
at least one electrochemical cell disposed in the at least one housing; and
at least two electrical connection terminals for electrically contacting the electrochemical accumulator, wherein at least one electrical connection terminal of the at least two electrical connection terminals is formed from at least two interconnected sections of differing metals or metal alloys coupled at an interface, wherein the interface is disposed within a passage defined in a housing wall of the at least one housing, wherein a fastening assembly extends between the passage and the at least one electrical connection terminal, wherein the at least one electrical connection terminal is rotationally symmetric about a central axis of the at least one electrical connection terminal, wherein an upper section of the at least two interconnected sections extends from the interface to an upper surface of the upper section protruding past the fastening assembly, wherein a lower section of the at least two interconnected sections includes a flange that extends from a lower surface of the lower section toward the interface, wherein the lower surface extends substantially parallel to the interface between diametric sides of the flange, and wherein the at least one electrical connection terminal comprises one or more connection features selected from the group consisting of:
a first connection feature, wherein the first connection feature includes an additional flange formed within the upper section between the upper surface and the interface, wherein the additional flange extends along the central axis from an intermediate surface of the additional flange toward the interface, wherein the intermediate surface is positioned axially between the upper surface and the interface;
a second connection feature, wherein the second connection feature includes the additional flange formed within the upper section between the upper surface of the upper section and the interface, wherein the upper section includes a connection portion extending between the additional flange and the upper surface, and wherein a radial dimension of the connection portion at the additional flange is less than a radial dimension of the upper portion at the interface; or
a third connection feature, wherein the third connection feature includes the lower section of the at least two interconnected sections extending from the interface to the lower surface of the lower section, wherein the lower surface is coupled to a positive terminal or a negative terminal of the at least one electrochemical cell, and wherein the fastening assembly comprises:
a washer disposed about a circumference of the at least one electrical connection terminal, wherein the washer is positioned between the upper surface of the upper section and the interface; and
an insulator disposed about the circumference of the at least one electrical connection terminal, wherein the insulator extends from the lower surface of the lower section and protrudes past the interface, wherein the insulator is disposed about a circumference of the washer and extends along a height of the washer, and wherein the insulator is a single piece component.

2. The electrochemical accumulator according to claim 1, wherein the upper section is indirectly connected to the positive terminal or the negative terminal of the at least one electrochemical cell via the lower section.

3. The electrochemical accumulator according to claim 1, wherein one section of the at least two interconnected sections comprises copper or consists of copper and another section of the at least two interconnected sections comprises aluminum or consists of aluminum.

4. The electrochemical accumulator according to claim 1, wherein the interface extends substantially parallel to the housing wall.

5. The electrochemical accumulator according to claim 1, wherein the at least one electrical connection terminal is sealed relative the housing.

6. The electrochemical accumulator according to claim 1, wherein at least one additional electrical connection terminal of the at least two electrical connection terminals is formed from a housing material of the electrochemical accumulator.

7. The electrochemical accumulator according to claim 6, wherein the at least one additional electrical connection terminal is molded into the housing wall of the electrochemical accumulator such that the at least one additional electrical connection terminal protrudes from an outer contour of the at least one housing.

8. The electrochemical accumulator according to claim 1, wherein the at least one electrochemical cell is a lithium-ion cell.

9. A method for manufacturing an electrochemical accumulator, comprising:
providing at least one housing, wherein at least one electrochemical cell is disposed in the at least one housing and at least two electrical connection terminals for electrically contacting the electrochemical accumulator extend from the at least one housing;
forming at least one electrical connection terminal of the at least two electrical connection terminals from at least two sections of different metals or metal alloys, wherein the at least two sections of different metals or metal alloys are coupled at an interface; and
positioning the at least one electrical connection terminal within a passage defined in a housing wall of the at least one housing, wherein the interface is disposed within the passage, wherein a fastening assembly extends between the passage and the at least one electrical connection terminal, wherein the at least one electrical connection terminal is rotationally symmetric about a central axis of the at least one electrical connection terminal, wherein an upper section of the at least two sections of differing metals or metal alloys extends from the interface and protrudes past the fastening assembly, wherein a lower section of the at least two sections of differing metals or metal alloys includes a flange that extends from a lower surface of the lower section toward the interface, wherein the lower surface extends substantially parallel to the interface between diametric sides of the flange, wherein the fastening assembly comprises a washer disposed about a circumference of the upper section and an insulator disposed about a circumference of the washer, wherein the insulator extends from the lower surface and extends along a height of the washer, and wherein the at least one electrical connection terminal comprises one or more connection features selected from the group consisting of:
a first connection feature, wherein the first connection feature includes an additional flange formed within the upper section between an upper surface of the upper section and the interface, wherein the additional flange extends along the central axis from an intermediate surface of the additional flange toward the interface, wherein the intermediate surface is positioned axially between the upper surface and the interface;
a second connection feature, wherein the second connection feature includes the additional flange formed within the upper section between the upper surface of the upper section and the interface, wherein the upper section includes a connection portion extending between the additional flange and the upper surface, and wherein a radial dimension of the connection portion at the additional flange is less than a radial dimension of the upper section at the interface; or
a third connection feature, wherein the third connection feature includes the lower section of the at least two sections of differing metals or metal alloys, wherein the lower section extends from the interface to the lower surface of the lower section, wherein the lower surface is coupled to a positive terminal or a negative terminal of the at least one electrochemical cell, wherein the washer is positioned between the upper surface of the upper section and the interface, and wherein the insulator is a single piece component that extends from the lower surface of the lower section and protrudes past the interface.

10. The method according to claim 9, comprising coupling the at least two sections of differing metals or metal alloys at the interface via a friction welding process.

11. The method according to claim 10, comprising coupling the lower surface of the lower section to the positive terminal or the negative terminal of the at least one electrochemical cell, wherein the lower surface extends substantially parallel to the housing wall.

12. The electrochemical accumulator according to claim 1, wherein, when the additional flange is formed within the upper section, the washer is disposed axially between the additional flange and a receiving surface of the insulator with respect to the central axis of the at least one electrical connection terminal.

13. The electrochemical accumulator according to claim 12, wherein a radial dimension of the additional flange extends substantially parallel to the interface.

* * * * *

UNITED STATES PATENT AND TRADEMARK OFFICE
CERTIFICATE OF CORRECTION

| | |
|---|---|
| PATENT NO. | : 10,505,174 B2 |
| APPLICATION NO. | : 15/032588 |
| DATED | : December 10, 2019 |
| INVENTOR(S) | : Ralf Joswig, Helge Brenner and Bernhard Ehrlich |

It is certified that error appears in the above-identified patent and that said Letters Patent is hereby corrected as shown below:

In the Specification

In Column 4, Line 17, delete "Scan" and insert -- 5 can --, therefor.

In the Claims

In Column 5, Line 54, in Claim 5, delete "relative the" and insert -- relative to the --, therefor.

In Column 6, Line 7, in Claim 9, delete "housing:" and insert -- housing; --, therefor.

Signed and Sealed this
Twenty-eighth Day of January, 2020

Andrei Iancu
*Director of the United States Patent and Trademark Office*